US008885017B2

(12) United States Patent
Butler-Smith et al.

(10) Patent No.: US 8,885,017 B2
(45) Date of Patent: Nov. 11, 2014

(54) REAL-TIME PROCESS AND TECHNOLOGY USING IMAGE PROCESSING TO MAINTAIN AND ENSURE VIEWER COMFORT DURING CAPTURE, LIVE TRANSMISSION, AND POST-PRODUCTION OF STEREOSCOPIC 3D IMAGERY

(75) Inventors: Bernard J. Butler-Smith, Malibu Lake, CA (US); Steven J. Schklair, Altadena, CA (US)

(73) Assignee: 3Ality Digital Systems, LLC, Burbank, CA (US)

( * ) Notice: Subject to any disclaimer, the term of this patent is extended or adjusted under 35 U.S.C. 154(b) by 2204 days.

(21) Appl. No.: 11/486,368

(22) Filed: Jul. 14, 2006

(65) Prior Publication Data

US 2007/0139612 A1   Jun. 21, 2007

Related U.S. Application Data

(60) Provisional application No. 60/698,963, filed on Jul. 14, 2005.

(51) Int. Cl.
*H04N 13/00* (2006.01)
*H04N 17/00* (2006.01)

(52) U.S. Cl.
CPC ....... *H04N 13/0059* (2013.01); *H04N 13/0051* (2013.01); *H04N 2213/002* (2013.01); *H04N 13/0003* (2013.01); *H04N 13/0033* (2013.01); *H04N 17/00* (2013.01)
USPC .................................. 348/42; 348/46; 348/51

(58) Field of Classification Search
CPC .......... H04N 13/0055; H04N 13/0029; H04N 13/0059; H04N 13/0239; H04N 13/0497
USPC ............................................................. 348/42
See application file for complete search history.

(56) References Cited

U.S. PATENT DOCUMENTS

| 5,416,510 | A | * | 5/1995 | Lipton et al. | 348/43 |
| 5,699,108 | A | * | 12/1997 | Katayama et al. | 348/47 |
| 6,384,872 | B1 | * | 5/2002 | Tsui et al. | 348/625 |
| 6,765,568 | B2 | * | 7/2004 | Swift et al. | 345/419 |
| 2002/0009137 | A1 | * | 1/2002 | Nelson et al. | 375/240.1 |
| 2003/0107646 | A1 | * | 6/2003 | Yoon | 348/51 |
| 2004/0057612 | A1 | * | 3/2004 | Tabata | 382/154 |

OTHER PUBLICATIONS

Kooi, Frank et al., Visual comfort of binocular and 3D displays, 2004 Elsevier, p. 99-108.*
Yano, Sumio et al., A study of visual and fatigue and visual comfort for 3D HDTV/HDTV images, 2002, p. 191-201, Elsevier.*
Inoue, Tetsuri et al., Accommodative responses to stereoscopic three-dimensional display, 1997 Optical Society of America, Jul. 1, 1997 vol. 36, No. 19 p. 4509-4515.*

(Continued)

*Primary Examiner* — Jessica M Prince
(74) *Attorney, Agent, or Firm* — Knobbe Martens Olson & Bear LLP

(57) ABSTRACT

A system for real-time image processing to maintain viewer comfort during capture, live transmission, and post-production of stereoscopic 3D imagery system comprising a) a stereoscopic 3D camera; b) an image capture processor operably connected to the stereoscopic 3D camera; c) one or more than one alarm operably connected to the image capture processor and the image display processor; d) one or more than one video switch operably connected to the display image processor; and e) a 3D display apparatus connected to the one or more than one video switch.

10 Claims, 1 Drawing Sheet

(56) References Cited

OTHER PUBLICATIONS

Inoue, Tetsuri "Accommodative responses to stereoscopic three dimensional display", Jul. 1, 1997 vol. 36 No. 19 Applied Optics, pp. 4509-4515.*

Lemmer et al., Enhancement of Stereoscopic Comfort by Fast Control of Frequency Content with Wavelet Transform, 2003, SPIE-IS &T, p. 283-290.*

Kool, Frank et al., Visual Comfort of Binocular and 3D displays, 2004, Elsevier, p. 99-108.*

Yano, Sumio et al., A stud of visual and fatigue and visual comfort for 3D HDTV/HDTV images, 2002, p. 191-201 Elsevier.*

Inoue, Tetsuri, et al., Accomadative responses to stereoscopic three dimensional display, 1997, Optical Society of America, Jul. 1, 1997 vol. 36. No. 19, p. 4509-4515.*

* cited by examiner

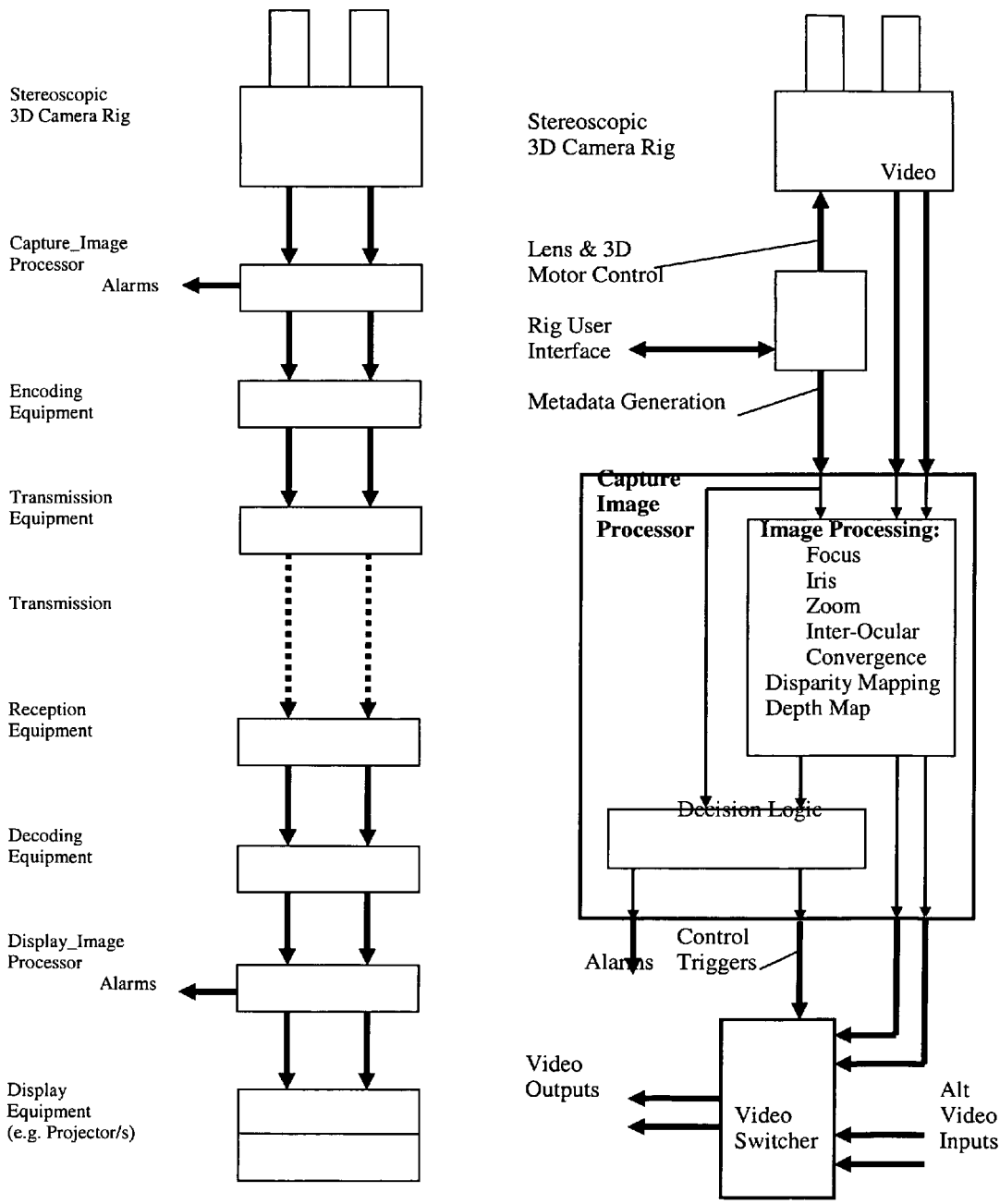

REAL-TIME PROCESS AND TECHNOLOGY USING IMAGE PROCESSING TO MAINTAIN AND ENSURE VIEWER COMFORT DURING CAPTURE, LIVE TRANSMISSION, AND POST-PRODUCTION OF STEREOSCOPIC 3D IMAGERY

CROSS-REFERENCE TO RELATED APPLICATIONS

This application claims priority to provisional application entitled, REAL-TIME PROCESS AND TECHNOLOGY USING IMAGE PROCESSING TO MAINTAIN AND INSURE VIEWER COMFORT DURING CAPTURE, LIVE TRANSMISSION, AND POST-PRODUCTION OF STEREOSCOPIC 3D IMAGERY, filed Jul. 14, 2005, having a Ser. No. 60/698,963, which is hereby incorporated by reference in its entirety.

FIELD OF THE INVENTION

The present invention relates generally to stereoscopic 3D camera and viewing systems.

BACKGROUND OF THE INVENTION

For many years stereoscopic 3D movies have been made. Some have been good, but many others have been bad. The badly made 3D movies have been mainly the symptom of inadequate equipment, or the lack of knowledge of good stereography. The effectively creates discomfort by the viewer, as well as having a negative impact on the 3D industry.

In this digital age, it is now feasible to create technological solutions to this dilemma.

This invention describes a process to ensure a comfortable Stereoscopic 3D viewing experience, whereby the viewer will observe natural 3D imagery without the psychovisual effects of eye strain, fatigue, or discomfort.

SUMMARY OF THE INVENTION

The process of this invention is performed by extracting useful information from visual content, by means of image-processing the 3D imagery from a stereoscopic 3D camera system, and provides an output response based on logic decisions and pre-defined thresholds.

The output response includes generating alarms to alert technical crew members of a "discomfort" condition so they may take corrective action. These alarms may be an audio or visual alert, and warn of the type of discomfort detected. The alarm condition may also trigger the automatic control of a video switching device, which would immediately route an appropriate "comfortable" input source to the output. The matrix switcher requires a common banking capability, because stereo pairs are routed simultaneously to the output.

The alarm condition may duplex a single camera or playback signal into an identical stereo pair, which will be 2D, but comfortable to view.

(The "comfortable" input source may be a pre-defined or known "comfortable" 3D camera imagery, or other video content from a playback device.)

BRIEF DESCRIPTION OF THE DRAWINGS

FIG. 1 shows a typical signal path of a "live" stereoscopic 3D infrastructure, including the processing units involved.

FIG. 2 shows a typical Capture-side detail, in the form of a block diagram.

DETAILED DESCRIPTION

One embodiment of this invention (FIG. 1) includes a complete "live" infrastructure, consisting of the following signal path: a stereoscopic 3D camera rig/s, an image processing unit to ensure comfortable 3D capture, encoding equipment, transmission equipment at the capture side, reception equipment at the viewing side/s, decoding equipment, an image-processing unit to ensure the reception conforms to comfortable 3D viewing, and a 3D display apparatus such as a 3D projector/s.

During capture, the imagery may be uncomfortable to view due to many variables and reasons, and these are quantified by image processing electronics, which generates alarms based on pre-defined criteria, and alarm thresholds.

When using a remote viewing location, where the video content is transmitted "live" from the 3D camera location, additional image processing electronics is required at the viewing location to ensure the projectors are fed "comfortable" 3D imagery, in case there is failure of the captured quality, during the transmission. The imagery can be corrupted, missing, noisy, or out of sync. This electronics system on the receiving side would use a subset of the image-processing described above, and use a matrix switched output, to guarantee the projectors are fed "comfortable" 3D content.

This process may also be used in post-production (offline), to ensure recorded media maintains comfortable 3D imagery, and generates similar output responses appropriate for an edit session, and is especially useful for finding transition points that are "comfortable" for close-matching 3D.

This invention uses a mathematical model to quantify acceptable ranges of comfort.

The capture-side (FIG. 2) input into to the system may include:
1) Imagery from the left camera of the stereoscopic 3D camera rig, to be image processed.
2) Imagery from the right camera of the stereoscopic 3D camera rig, to be image processed.
3) Focus metadata from the 3D rig.
4) Iris metadata from the 3D rig.
5) Zoom metadata from the 3D rig.
6) Inter-Ocular metadata from the 3D rig.
7) Convergence metadata from the 3D rig.
8) Screen dimensions. (for TV, theater, IMAX, etc)
9) Distance range between this screen and the viewers.
10) Acceptable image horizontal disparity, which may be expressed as a percentage of total image size.
11) Fusional range.
12) Alarm thresholds:
a) Gross difference (non-"fusable")
b) Focus disparity
c) Luminance disparity
d) Chrominance disparity
e) Magnification disparity
f) Telecentricity disparity
g) "Broken frame" acceptance level
h) Vertical content weighting factor
i) Vertical disparity (expressed as number of lines, angle, or Percentage of screen height)

To generate an alarm, the system's image-processing function will first look for obvious image errors such as missing video from a camera or cameras, or out-of-sync video, either sub-frame or multiple frame.

Then obvious lens mismatch is processed. Focus disparity is calculated, where the image-processing algorithm includes edge detection and/or a high-pass filtering to narrow in on the highest frequency detail of the chart. Luminance disparity (created by iris, gamma, black-level, knee, etc.) is calculated, where the image-processing algorithm includes image subtraction and/or image correlation. Chrominance disparity (hue, saturation) is calculated, where the image-processing algorithm includes color matrix conversion, and image correlation. Alarms are generated if the mismatches exceed pre-defined thresholds.

Then by using disparity mapping, by block and pixel methods, a depth map is created. This is done using a standard neural-net process, where strong links are magnified (for adjacency) by parallel vector analysis to find stereoscopically "fusable" subject matter. Broken links in the neural-net will be determined to be caused by either "breaking frame" on the boundary of the images, or from stereoscopic occlusion within the images. The "breaking-frame" condition has an adjustable acceptance level, or alarm threshold.

"Blob analysis" algorithms are used to combine any linked "fusable" subject matter into bigger "blobs".

The amount of "fusable" subject matter, as an area ratio of the full screen size, is used to determine if there is a gross difference from both camera views, which may be caused by something obstructing the view of one camera. If this gross difference is sufficient to exceed the alarm threshold, an alarm condition will be generated.

The "blobs are analyzed for and magnification disparity (zoom mismatch), and telecentricity mismatch, upon which an alarm will be generated if these mismatches exceed the alarm thresholds.

The range of all angles to the boundaries of "fusable" subject matter, or "fusional range" are calculated, and if any angle exceeds the alarm threshold, an alarm will be generated. These angles to the "fusable" subject matter are performed in the horizontal plane, as this is the natural stereoscopic horizontal disparity. Excessive horizontal disparity, either towards viewer divergence or excessive convergence, will generate an alarm.

The search range of the neural net will include several lines above and below the present search range, to extract possible vertical or rotational disparity, upon which an alarm will be generated if the vertical disparity is found to exceed the alarm threshold, and takes into account the screen size.

The background will be searched for a concentration of vertical content (such as lamp posts, or a fence line). A Fourier transform is performed in the horizontal direction to extract this in the frequency domain. This area of the image will be considered less stereoscopically "fusable", and weighted accordingly, taking into account other "fusable" subject matter. An alarm will be generated if it exceeds a pre-defined threshold.

Finally, the remaining uncategorized areas will be deemed occlusion areas, and will be ignored, because they are naturally stereoscopic.

The alarm condition may also trigger the automatic control of a video switching device, which would immediately route an appropriate "comfortable" input source to the output.

What is claimed is:

1. A system for real-time image processing to maintain viewer comfort during capture, live transmission, and post-production of stereoscopic 3D imagery, the system comprising:
    a stereoscopic 3D camera rig (3D rig) comprising a stereoscopic 3D camera;
    an image capture processor operably connected to the stereoscopic 3D camera, wherein the image capture processor executes instructions to implement real time image processing of 3D stereoscopic image inputs and further executes decision logic instructions to determine an alarm condition based on the real time image processing;
    one or more than one alarm operably connected to the image capture processor and a display image processor;
    one or more than one video switch operably connected to the display image processor; and
    a 3D display connected to the one or more than one video switch, wherein the stereoscopic image inputs comprise:
        one or more images from a left camera of the stereoscopic 3D camera;
        one or more images from a right camera of the stereoscopic 3D camera;
        focus metadata associated with the 3D rig;
        iris metadata associated with the 3D rig;
        zoom metadata associated with the 3D rig;
        inter-ocular metadata associated with the 3D rig;
        convergence metadata associated with the 3D rig;
        one or more screen dimensions associated with the 3D display;
        one or both of a distance range between a screen of the 3D display and one or more viewers and a distance between the screen of the 3D display and one or more viewers;
        image horizontal disparity, that can be expressed as a percentage of total image size;
        fusional range; and
        one or more alarm thresholds.

2. The system of claim 1, wherein the system further comprises:
    an encoder operably connected to the image capture processor;
    a transmitter operably connected to the encoder;
    a receiver operably connected to the transmitter; and
    a decoder operably connected to the receiver;
    wherein the display image processor is operably connected to the decoder.

3. The system of claim 1, wherein the stereoscopic 3D camera comprises:
    a 3D and lens motor control connected to the 3D rig; and
    a user interface connected to the 3D rig.

4. The system of claim 1, wherein the screen dimensions comprise an average of an expected screen size.

5. The system of claim 1, wherein the screen dimensions comprise an expected largest screen size.

6. The system of claim 1, wherein the alarm thresholds are selected from the group consisting of gross (non-"fusable") difference, focus disparity, luminance disparity, chrominance disparity, magnification disparity, telecentricity disparity, "broken frame" acceptance levels, vertical content weighting factors and vertical disparity values expressed as number of lines, angle, or percentage of screen height.

7. The system of claim 1, wherein the one or more than one alarm outputs a visual alarm.

8. The system of claim 1, wherein the one or more than one alarm outputs an audible alarm.

9. The system of claim 1, wherein the one or more than one video switch causes a switch between displaying normal or alternative video.

10. The system of claim 1, wherein the one or more than one video switch comprises a matrix switcher having common banking capability so that stereo pairs are routed simultaneously to the output.

* * * * *